United States Patent [19]
Covert et al.

[11] Patent Number: 5,421,686
[45] Date of Patent: Jun. 6, 1995

[54] LOADING AND UNLOADING SYSTEM

[75] Inventors: William J. Covert, Berlin; Walter D. Robison, Haddon Heights, both of N.J.

[73] Assignee: Hull Corporation, Hatboro, Pa.

[21] Appl. No.: 38,377

[22] Filed: Mar. 29, 1993

[51] Int. Cl.⁶ ................................................. F26B 13/30
[52] U.S. Cl. ......................................... 414/287; 34/236; 34/92
[58] Field of Search ................. 34/5, 15, 92, 236, 217; 414/331, 287, 401

[56] References Cited

U.S. PATENT DOCUMENTS

| | | | |
|---|---|---|---|
| 3,831,293 | 8/1974 | Ingram et al. | 34/236 |
| 4,396,338 | 8/1983 | Applegate et al. | 414/331 |
| 4,506,455 | 3/1985 | Rossi | 34/5 |
| 5,129,162 | 7/1992 | Hemmersbach et al. | 34/92 X |
| 5,261,774 | 11/1993 | Le Floc'h et al. | 414/331 |

*Primary Examiner*—Frank E. Werner
*Assistant Examiner*—James Eller
*Attorney, Agent, or Firm*—Norman E. Lehrer

[57] ABSTRACT

A system for automatically loading and unloading bottles, vials, or other containers into and out of a freeze dryer or other material treating apparatus includes a loading station and a conveyer for bringing bottles to the loading station. A transfer vehicle movable between the loading station and one or more freeze dryers includes a horizontally arranged platen for supporting an entire dryer shelf of bottles. When the vehicle is aligned with the loading station, a pusher bar slides bottles from the loading station onto the vehicle platen. The vehicle then moves to a dryer where the platen aligns itself with one of the dryer shelves. A guide bar at the rear end of a rectangularly shaped lasso or transfer cage moves forwardly pushing the bottles onto the shelf. The forward end of the cage is then raised above the height of the bottles and removed from the dryer. To unload a dryer shelf, the cage enters the dryer above the bottles and the forward end drops down behind them. The bottles are then drawn out from the shelf onto the vehicle platen by the cage. Thereafter, the vehicle is moved to an unloading station where an unloading transfer guide at the forward end of the vehicle moves rearwardly to push the bottles from the platen onto an unloading conveyer.

17 Claims, 10 Drawing Sheets

LOADING AND UNLOADING SYSTEM

BACKGROUND OF THE INVENTION

The present invention is directed toward a system for loading and unloading bottles, vials or other similar containers into and out of a freeze dryer, oven, autoclave or other material treating apparatus and, more particularly, to such a system which can automatically load or unload an entire shelf of bottles or other containers without manual assistance.

Freeze dryers, sometimes referred to as lyophilization autoclaves, are widely used in the pharmaceutical industry for desiccating pharmaceuticals in bottles and sealing the bottles. Conventional freeze dryers include a plurality of vertically movable shelves. When the dryer is empty, all of the shelves are in the lowermost position and a tray of bottles is manually loaded onto the uppermost shelf. Conventionally, this is accomplished by the use of a three-sided tray which has the bottles on the upper surface thereof in aligned rows and columns.

Normally a hoop surrounds all of the bottles on a tray in order to help maintain them in an upright position. The tray with the bottles thereon is placed on the shelf and is then manually slid outwardly so that all of the bottles and the hoop remain in the dryer. The shelf is then moved upwardly and the process is repeated with a second group of bottles being placed on the second shelf. As each shelf moves upwardly, it engages either the top of the dryer or the shelf above it to force the bottle stoppers down into the bottles in order to seal the same.

The unloading of a freeze dryer shelf is conventionally done in substantially the same manner. That is, the lowermost shelf with the bottles thereon is lowered and a three-sided tray is slid under the bottles. The combined tray, bottles and hoop is then manually removed from the shelf.

The foregoing conventional process is slow and labor intensive and is, accordingly, relatively expensive. It has been proposed to use a carriage assembly or the like for moving a plurality of bottles into the vicinity of a freeze dryer shelf so that the same can then be slid onto the shelf. One such system is shown, for example, in U.S. Pat. No. 4,506,455. However, the system shown in that patent remains labor intensive.

To Applicant's knowledge, no one heretofore has proposed an automatic system for loading and unloading bottles into and out of a freeze dryer without manual intervention. Such a system would, of course, greatly increase the speed of operation and reduce the costs involved.

SUMMARY OF THE INVENTION

The present invention overcomes the problems of the prior art discussed above and provides an arrangement which operates substantially faster and more efficiently than conventional manual arrangements. The invention is directed toward a system for automatically loading and unloading bottles or vials or the like into and out of a freeze dryer, oven, autoclave or other similar apparatus and includes a loading station including a conveyer for bringing bottles to the loading station. A transfer vehicle movable between the loading station and one or more freeze dryers includes a horizontally arranged platen for supporting an entire dryer shelf of bottles. When the vehicle is aligned with the loading station, a pusher bar slides bottles from the loading station onto the vehicle platen. The vehicle then moves to a dryer where the platen aligns itself with one of the dryer shelves. A guide bar at the rear end of a rectangularly shaped lasso or transfer cage moves forwardly pushing the bottles onto the shelf. The forward end of the cage is then raised above the height of the bottles and removed from the dryer. To unload a dryer shelf, the cage enters the dryer above the bottles and the forward end drops down behind them. The bottles are then drawn out from the shelf onto the vehicle platen by the cage. Thereafter, the vehicle is moved to an unloading station where an unloading transfer guide at the forward end of the vehicle moves rearwardly to push the bottles from the platen onto an unloading conveyer.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
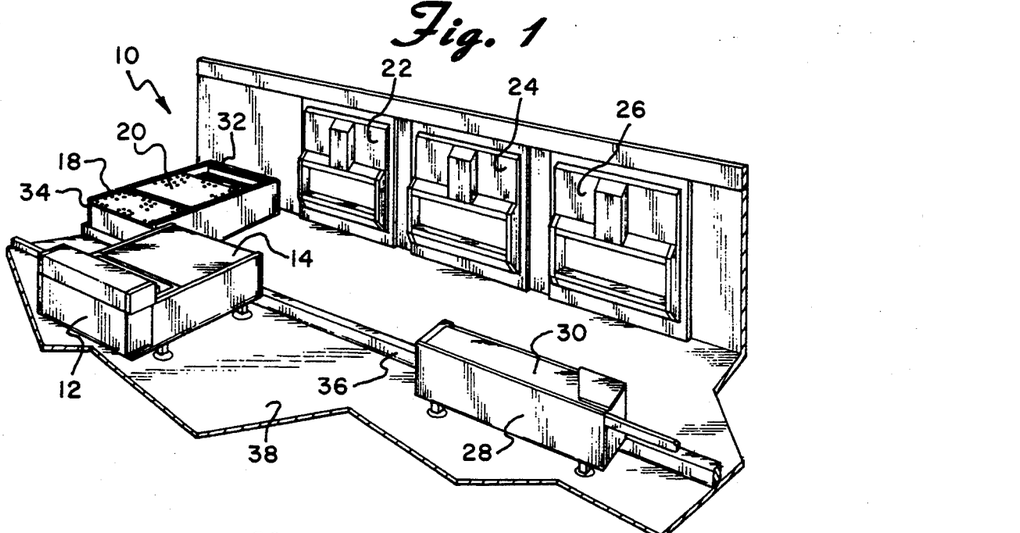
FIG. 1 is a perspective view generally showing a loading and unloading system in accordance with the principles of the present invention.

Referring now to the drawings in detail wherein like reference numerals have been used throughout the various figures to designate like elements, there is shown in FIG. 1 a freeze dryer automatic loading and unloading system constructed in accordance with the principles of the present invention and designated generally as 10. The system 10 is shown somewhat diagrammatically and includes four major components: a loading station 12 having a horizontal loading surface 14 for accumulating a plurality of bottles or vials 16 thereon (see FIGS. 2a–c); a transfer vehicle 18 having a horizontally arranged platen 20; a plurality of freeze dryers 22, 24 and 26 and a discharge or unloading station 28 having a horizontally arranged unloading surface 30.

Although three freeze dryers 22, 24 and 26 are illustrated in FIG. 1, it should be readily apparent that fewer or more freeze dryers could be employed with the present invention. That is, the system of the present invention could be used to load and unload the bottles from loading station 12 to and from only a single freeze dryer such as freeze dryer 22 and to then discharge the bottles onto the discharge or unloading station 28. Similarly, the system 10 could employ more than the three freeze dryers shown if the same were desired. Even further, the freeze dryers need not necessarily be in alignment with each other but may be opposite each other or in some other configuration.

The details of the various major components of the invention will be described in more detail hereinafter. However, it can be seen from FIG. 1 that the transfer vehicle 18 has a front end 32 and a rear end 34. Means are provided for moving the transfer vehicle sideways, perpendicular to the front and rear ends. That is, the vehicle 18 can be moved from left to right as viewed in FIG. 1. A horizontal track or rail 36 is provided on the floor 38 in order to guide the movement of the transfer vehicle 18 and maintain the same in proper alignment. While the track 36 is shown as being in a straight line, it should be obvious that it could also be curved. Furthermore, it is possible to mount the transfer vehicle 18 so that it is capable of rotational movement, if desired.

Movement of the transfer vehicle 18 along the track 36 allows the rear end 34 thereof to selectively be moved into alignment with either the loading station 12 or the unloading station 28. Similarly, the front end 32 of the transfer vehicle 18 can be selectively moved into alignment with either one of the freeze dryers 22, 24 or 26. In addition, motor means are provided within the transfer vehicle 18 so that the height of the platen 20, above the floor 38, can be adjusted as needed. (See FIG. 6) Thus, the height of the platen 20 can be adjusted so as to be in horizontal co-planar alignment with the loading surface 14 or the loading surface 30 or a shelf of one of the freeze dryers (to be described more fully hereinafter). Even further and for reasons that will become clearer hereinafter, the platen 20 of the transfer vehicle 18 is capable of sliding forwardly or rearwardly relative to the remaining parts of the vehicle.

Figure 2:
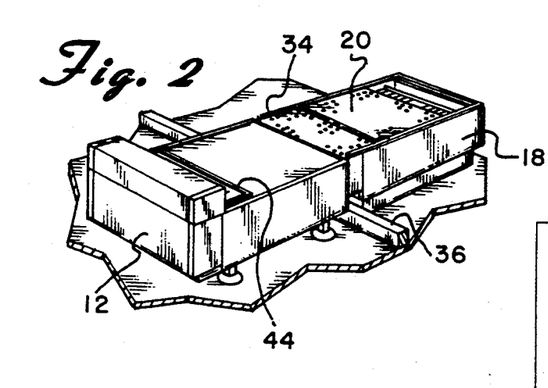
FIG. 2 is a perspective view of the transfer vehicle of the invention in alignment with a loading station.
Figure 2A:
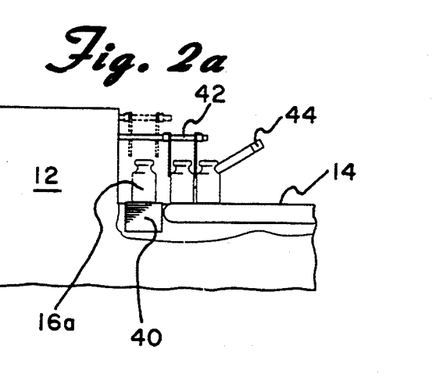
FIGS. 2a, 2b and 2c are schematic illustrations showing bottles being moved into the loading station and onto the transfer vehicle.
Figure 2B:
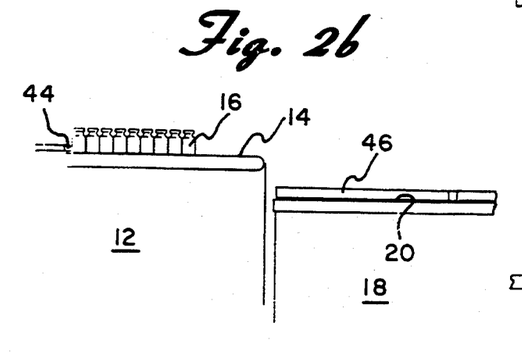
Figure 2C:
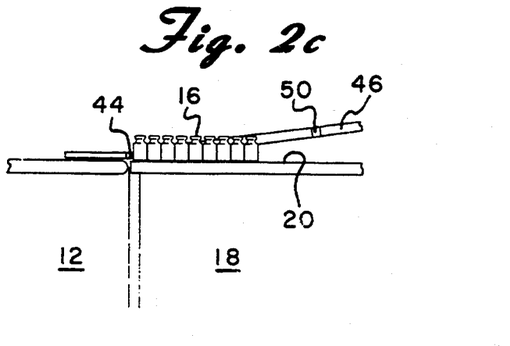

FIGS. 2–2c illustrate the manner in which bottles 16 are fed to the loading station 12 and then transferred to the platen 20 of the transfer vehicle 18. As shown in FIG. 2, the transfer vehicle 18 has been moved horizontally so that the rear end 34 thereof is in alignment with the loading station 12. The height of the vehicle 12 has been adjusted so that the platen 20 is in the same horizontal plane as the loading surface 14. The platen 20 has also been moved rearwardly toward the rear end 34 so as to be in substantial abutment with the free forward end of the loading surface 14. (See FIG. 2c)

As shown in FIG. 2a, a series or row of bottles 16a is brought onto the loading station by a single line conveyer belt 40 from an in-feed conveyer (not shown) at the side of the loading station. When a complete row of bottles 16a is on the conveyer 40, the conveyer stops and an overhead pusher 42 drops down and pushes the entire row of bottles 16a forwardly onto the loading surface 14. This process continues as shown in FIGS. 2a and 2b until the required number of bottles 16 have been accumulated on the loading surface 14. These bottles 16 will be arranged in an orderly alignment of rows and columns.

When the required numbers of bottles 16 have been accumulated on the loading surface 14, the transfer vehicle 18 is brought into alignment as shown in FIGS. 2 and 2c. A guide in the form of a pusher bar 44 which had been in a raised position as shown in FIG. 2a is then lowered so as to be behind the bottles 16. The guide 44 then moves forwardly pushing the entire assembly of bottles onto the platen 20 of the transfer vehicle 18.

Figure 7:
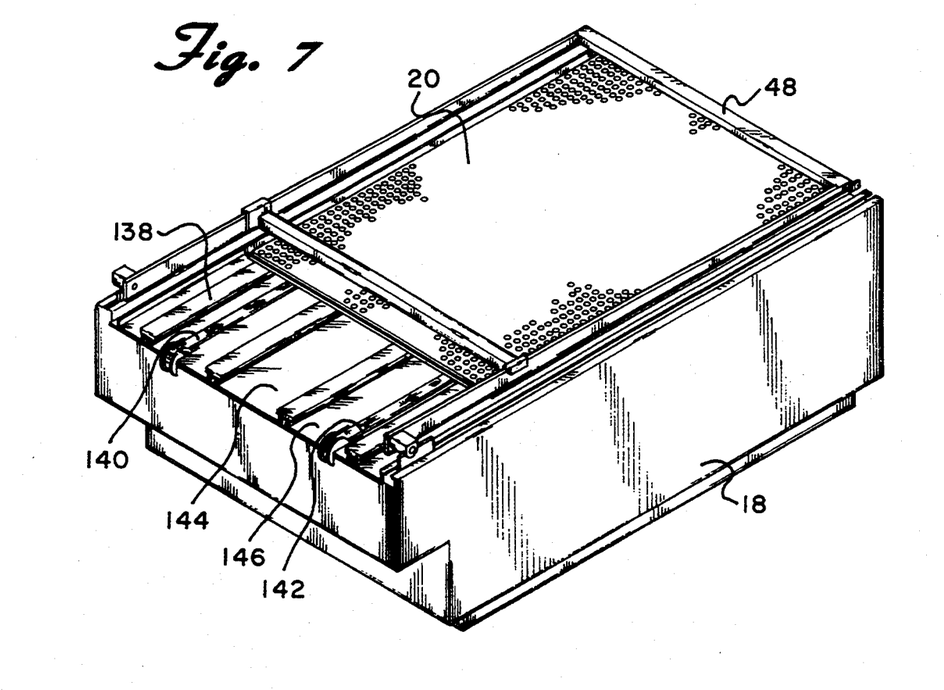
FIG. 7 is a perspective view of the transfer vehicle showing the same in greater detail.
Figure 8:
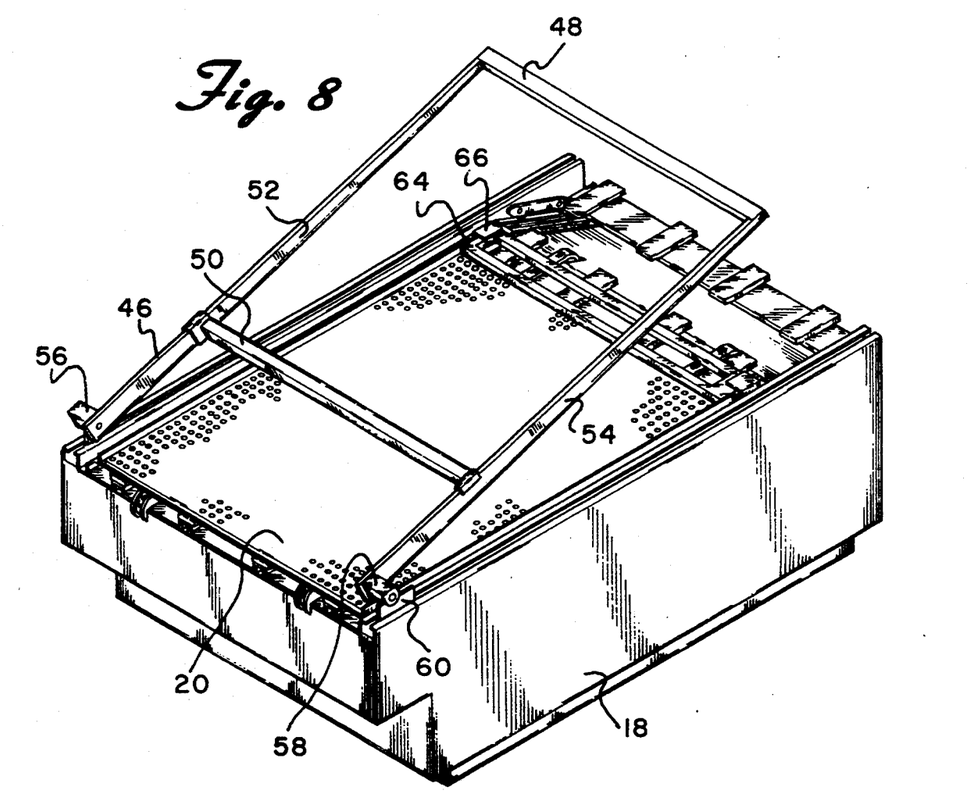
FIG. 8 is a view similar to FIG. 7 showing the transfer vehicle in a different mode.
Figure 9:
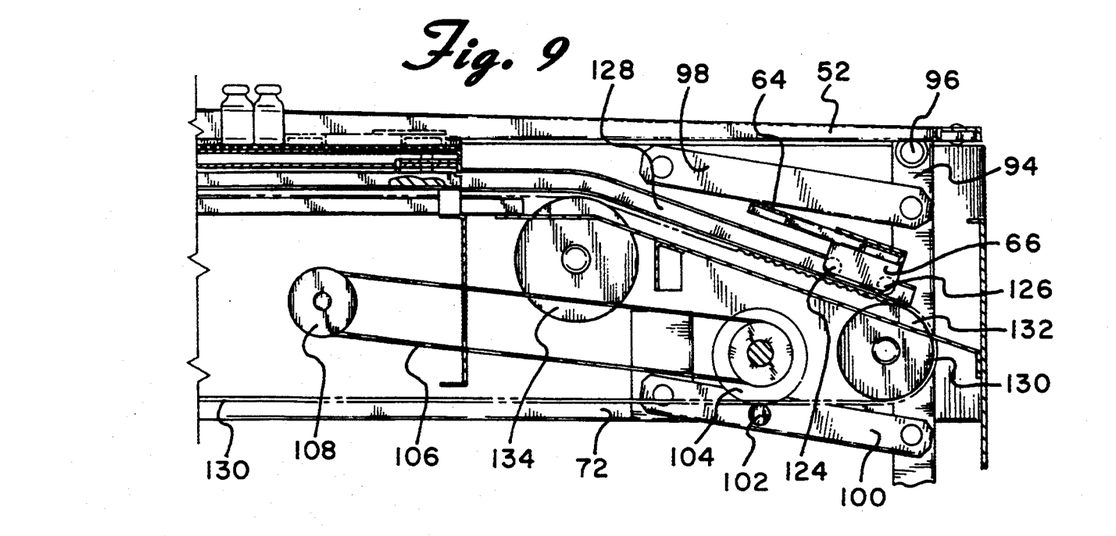
FIG. 9 is a cross-sectional view through the longitudinal center of FIG. 8 showing the details thereof.
Figure 10:
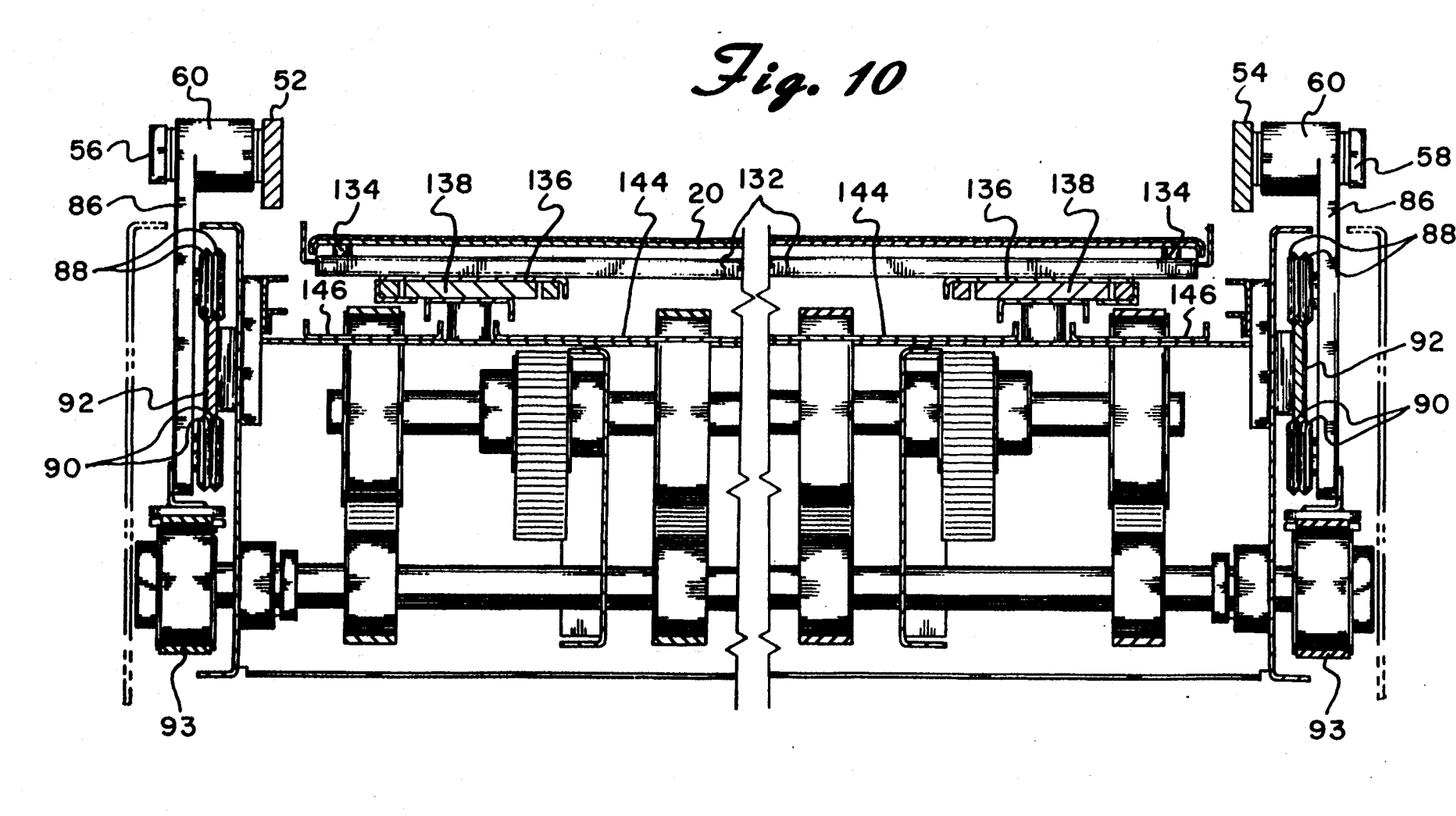
FIG. 10 is an enlarged cross-sectional view taken through the forward end of FIG. 8.

As can best be seen in FIG. 8, the top of the transfer vehicle 18 carries a transfer cage or lasso in the form of a frame 46 having a forward horizontally extending bar 48 and a rear horizontally extending push bar 50. The rear ends of side frame members 52 and 54 of the cage 46 are pivoted at points 56 and 58 to a cage slide mechanism 60, the details of which will be described in more detail hereinafter. As a result, the cage 46 is capable of being pivoted upwardly as shown in FIG. 8 and downwardly into its down position as shown in FIGS. 7 and 9. The cage slide mechanism 60 also permits the cage to move rearwardly and forwardly relative to the platen 20.

Referring again to FIG. 2c, it can be seen that when the guide 44 pushes the bottles 16 onto the platen 20, the transfer cage 46 is in its raised position so that the bottles 16 can pass under the rear transfer push bar 50. After a complete set of bottles 16 has been transferred from the loading station onto the platen 20 of the transfer vehicle 18, the platen moves forwardly into the position shown in FIG. 3 and the transfer cage is lowered so that the push bar 50 lies behind the rearwardmost row of bottles 16 as shown in FIG. 3a.

Figures 3, 3A:
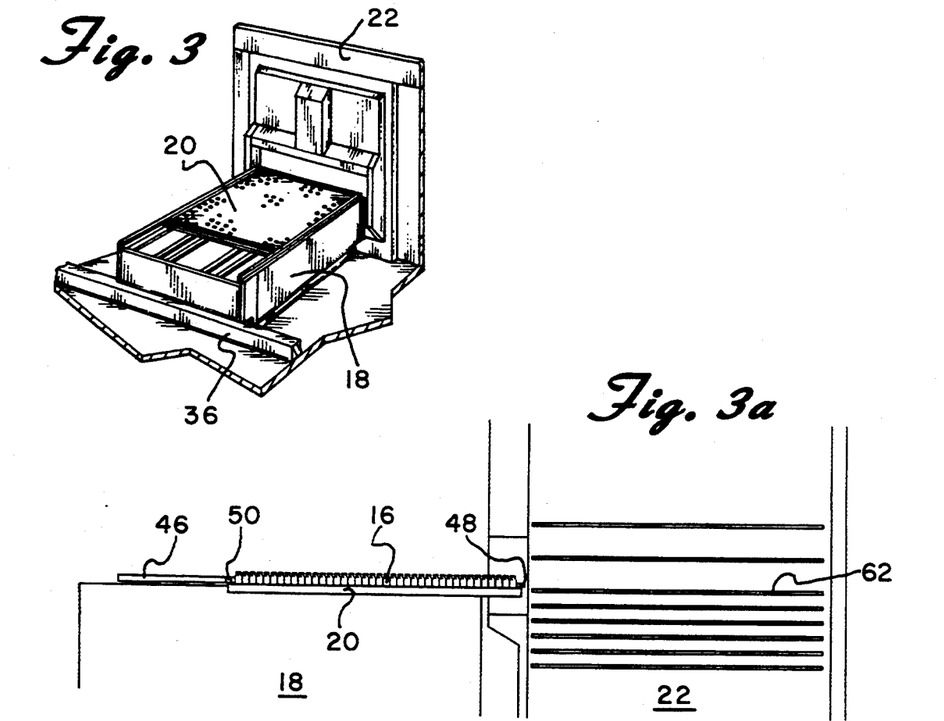
FIG. 3 is a perspective view of the transfer vehicle of the invention in alignment with a freeze dryer.
FIGS. 3a, 3b, 3c and 3d are schematic cross-sectional views showing the manner in which bottles are transferred from the transfer vehicle onto a freeze dryer shelf.
Figure 3B:
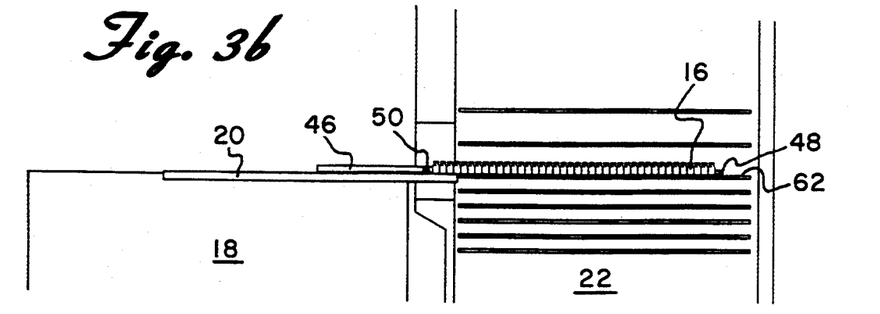

The manner in which the bottles 16 are transferred from the transfer vehicle platen 20 to the freeze dryer can be seen from FIGS. 3 and 3a–d. As shown in FIG. 3, the vehicle 18, guided by the rail 36 is first moved horizontally so as to be in alignment with one of the freeze dryers such as freeze dryer 22. The height of the vehicle 18 is then adjusted so as to have the platen 20 be in proper vertical alignment with one of the shelves such as shelf 62 within the freeze dryer which is to be loaded with the bottles 16. (The details of this operation will be described more fully hereinafter.) The platen 20 is then moved forwardly so that its forwardmost end abuts the shelf 62. Once this occurs, the transfer cage 46 moves forwardly and as it does so, bar 50 pushes all of the bottles 16 onto the shelf 62.

In the preferred embodiment, the entire transfer cage 46 pivots downwardly into the position shown in FIG. 3a so that the bar 50 lies behind the bottles to push them onto the shelf. It is also possible, however, to mount the bar 50 so as to pivot downwardly relative to the rest of the transfer cage. The bar 50 could, therefore, move downwardly and lie behind the bottles on the platen while the forward crossbar 48 remained elevated. This would allow the transfer cage 46 to transfer less than a full shelf of bottles onto a shelf that already has bottles thereon.

Figure 3C:
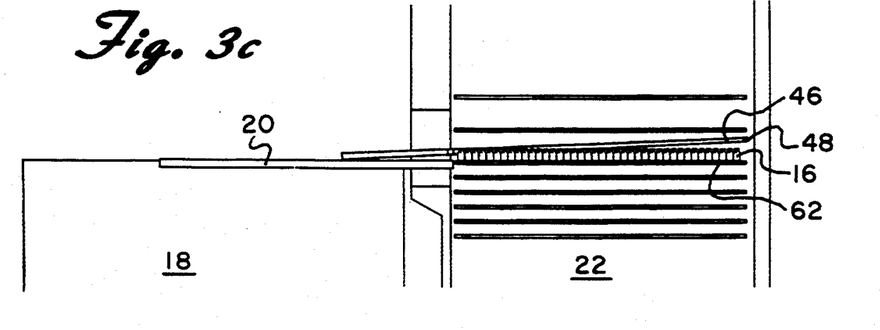
Figure 3D:
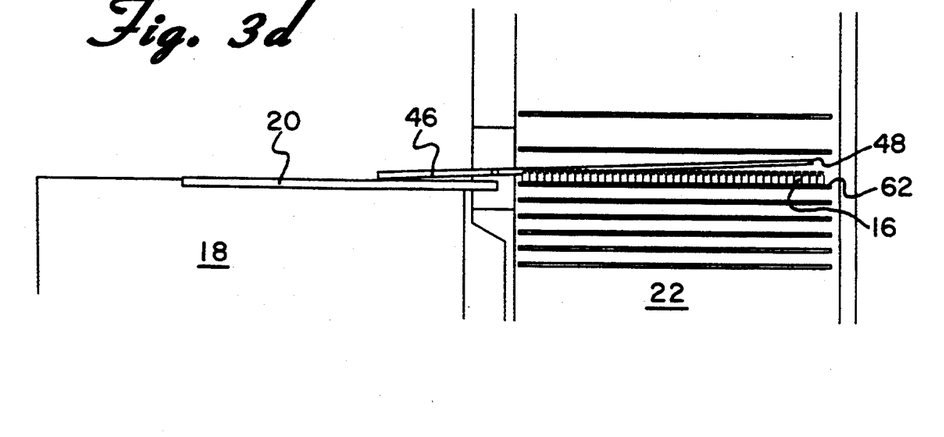

As can be seen in FIG. 3c, once all of the bottles 16 are properly loaded onto the shelf 62, the transfer cage 46 is pivoted upwardly so that the forward crossbar 48 is above the height of the bottles. Both the platen 20 and transfer cage 46 can then be withdrawn from the freeze dryer 22 as shown in FIG. 3d. So as to ensure a relatively smooth operation, the tops of the sides of the forwardmost end of the transfer cage 46 may be provided with rollers which can engage the lower surface of the next higher shelf within the freeze dryer 22 as the transfer cage and platen are moved rearwardly out of the dryer.

After the transfer cage and platen have been withdrawn fully from the freeze dryer 22, the transfer vehicle 18 is ready to return to the loading station for a second load of bottles. By this time, the loading station will have accumulated a sufficient quantity of bottles on the horizontal loading surface 14 and will be waiting to transfer the same onto the vehicle platen in the manner discussed above.

FIGS. 4 and 4a-c illustrate the manner in which the transfer vehicle 18 of the system 10 removes a complete shelf of bottles from the freeze dryers after the bottles have been subjected to the freeze drying process. The details of the operation of the freeze dryer are well known to those skilled in the art and will not, therefore, be described herein.

Figure 4:
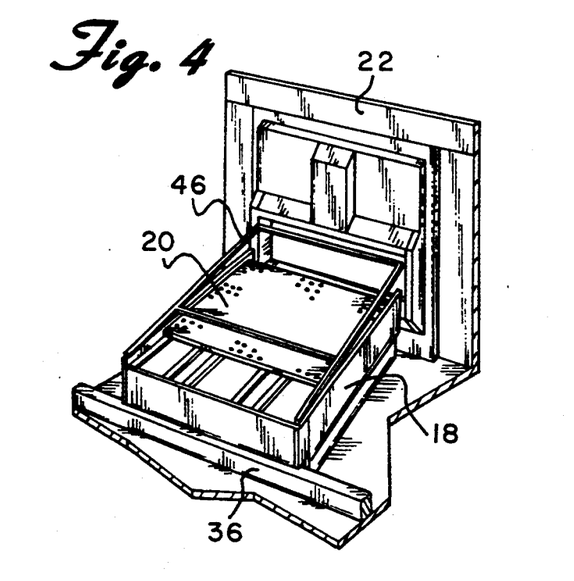
FIG. 4 is a perspective view of a transfer vehicle in alignment with a freeze dryer just prior to the initiation of an unloading procedure.
Figure 4A:
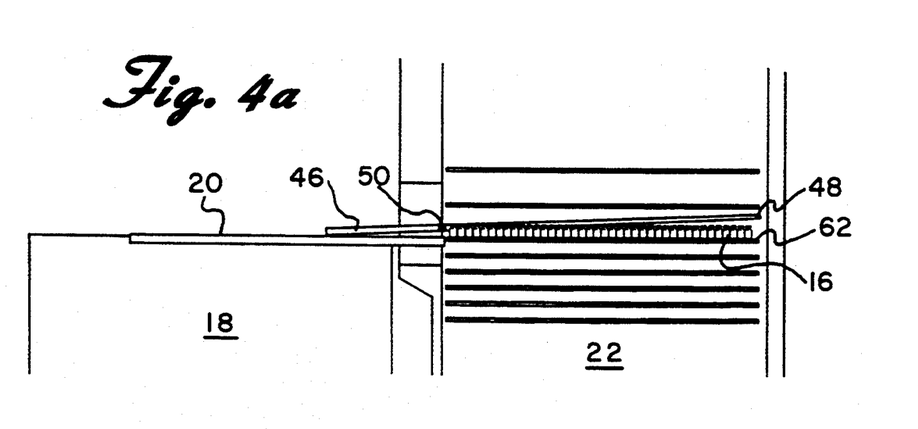
FIGS. 4a, 4b and 4c are schematic cross-sectional representations showing a shelf of a freeze dryer being unloaded onto the transfer vehicle.
Figure 4B:
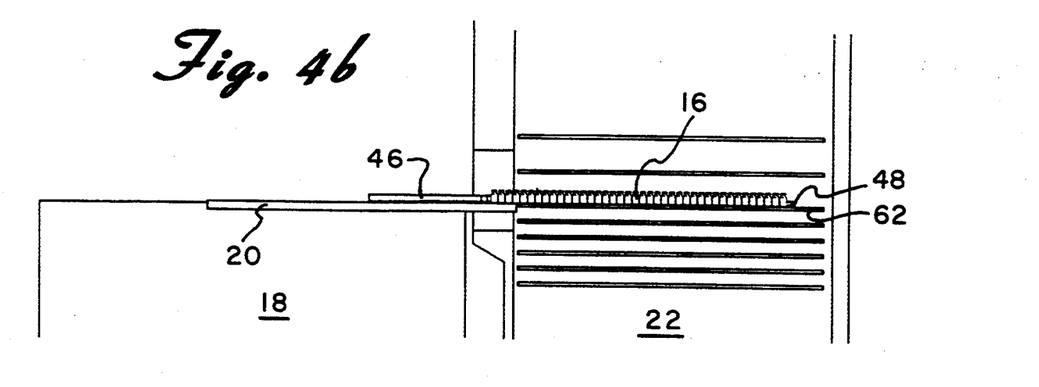
Figure 4C:
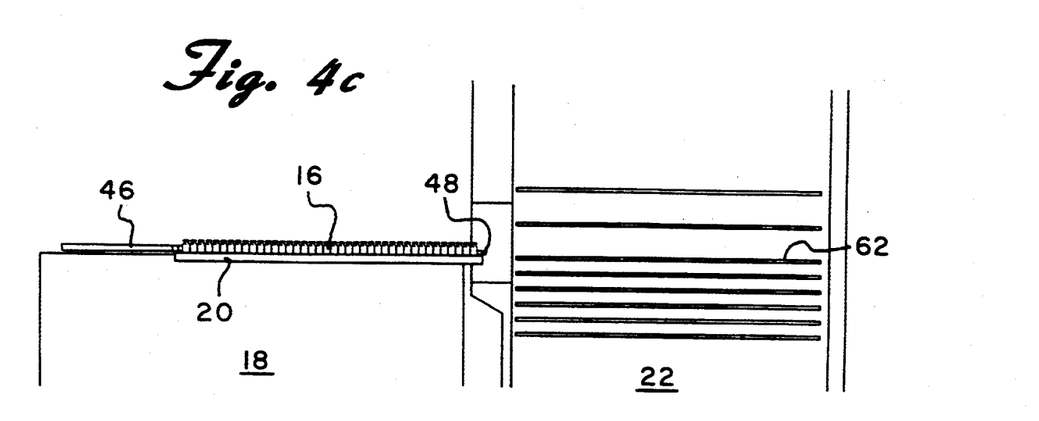
Figure 6:
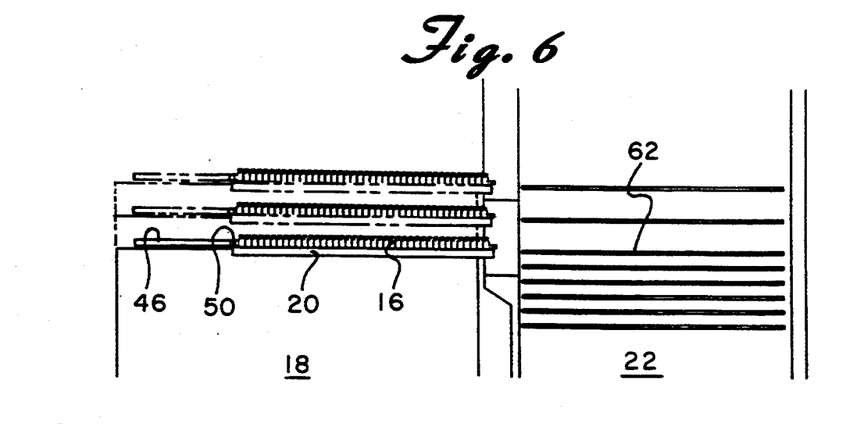
FIG. 6 is a schematic representation showing the vertical movement of the transfer vehicle.

Again, being guided by the rail or track 36, the transfer vehicle 18 is aligned with the freeze dryer to be emptied such as freeze dryer 22. The height of the vehicle is adjusted as shown in FIG. 6 so that the platen 20 is in vertical alignment with the selected shelf such as shelf 62 and the platen 20 is moved forwardly to engage the shelf. The transfer cage 46 is then pivoted upwardly and slid into the freeze dryer above the bottles 16 until the horizontal bar 48 at the forward end of the transfer cage 46 is beyond the forwardmost row of bottles as shown in FIG. 4a. At this point, the transfer cage is lowered so as to surround the bottles on the shelf and is withdrawn rearwardly from the freeze dryer as shown in FIG. 4b. As the transfer cage 46 moves rearwardly, the bar 48 pulls all of the bottles off of the shelf 62 onto the platen 20 of the transfer vehicle 18. When all of the bottles 16 are on the platen 20, the platen moves rearwardly so as to disengage the shelf 62 as can best be seen in FIG. 4c.

Figure 5:
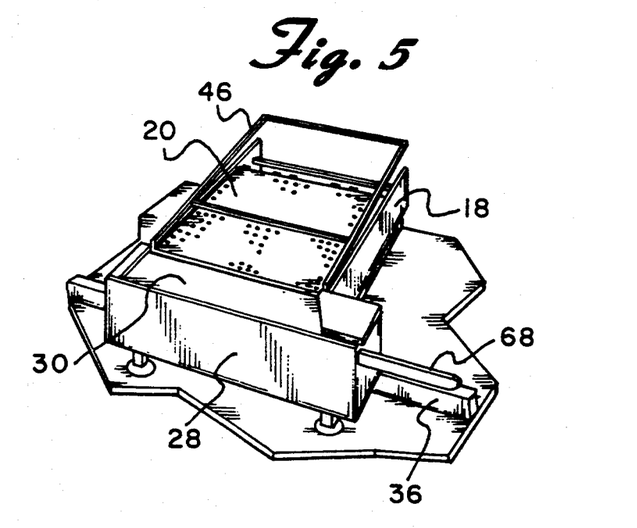
FIG. 5 is a perspective view of the transfer vehicle in alignment with a discharge station.
Figure 5A:
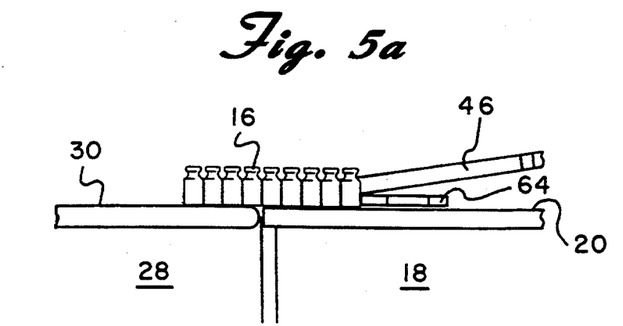
FIG. 5a is a cross-sectional schematic representation showing bottles being transferred from the transfer vehicle to the discharge station.

FIGS. 5 and 5a show the transfer of the finished bottles 16 from the transfer vehicle 18 to the discharge station 28. Again, guided by the track 36, the transfer vehicle moves into alignment with the transfer station 28. The vehicle is then moved vertically so that the platen 20 is in vertical alignment with the unloading surface 30 of the discharge station 28. The transfer cage 46 is then pivoted upwardly so that the rear cross bar 50 is above the height of the bottles 16 and the platen 20 moves rearwardly until it abuts the forward edge of the unloading surface 30.

Normally located beneath the platen 20 within the body of the transfer vehicle 18 and at the forward end thereof is a discharge transfer pusher guide bar 64. (See FIGS. 9 and 11) Discharge transfer guide bar 64 is carried by carriage 66 which, in the manner to be described in more detail hereinafter, is capable of moving the discharge guide upwardly to just above the level of the platen 20 and then rearwardly parallel to the upper surface of the platen. The discharge transfer guide 64 then engages the forwardmost row of bottles 16 and pushes the entire assembly of bottles rearwardly onto the unloading surface 30 of the discharge station 28 as shown in FIG. 5a.

The discharge station 28 is preferably comprised of a conventional belt conveyer or the like which moves the bottles across the same onto a single line conveyer 68. From there, the finished bottles can be moved to any desired remote location for further processing, labeling or packaging. Once the bottles have all been discharged from the transfer vehicle to the discharge station, the transfer vehicle can return to a freeze dryer to unload another shelf.

The foregoing has been a general description of the transfer vehicle 18 and of the manner in which the same can transfer a full shelf of bottles from a loading station to the shelf of a freeze dryer and subsequently from the shelf of a freeze dryer to a discharge station. The details of the construction of the transfer vehicle 18 are shown more clearly in FIGS. 7-14 and reference should be made to those drawings in connection with the following description.

The main portion of the transfer vehicle 18 is comprised of a base assembly 70 and a frame assembly 72. The base assembly 70 supports the frame assembly 72 and includes wheels 74 and 76 at the bottom thereof which allow the vehicle 18 to move horizontally across the floor 38. Rollers 78 mounted at the rear (or left side of the transfer vehicle 18 when viewed in FIG. 11) may also be provided for engaging the track or rail 36 in order to maintain the proper alignment of the vehicle with respect to the other components of the system 10.

The frame assembly 72 is supported on the base assembly 70 by compression springs such as shown at 80. A plurality of lifting levers such as shown at 82 and 84 are pivoted to each other and to the base assembly and frame assembly 72 so as to guide the frame assembly 72 in the vertical direction with respect to the base assembly 70. While the spring 80 provides sufficient force to raise the frame assembly 72, appropriate lifting motor means (not shown) are provided for pulling the frame assembly downwardly against the force of the spring when needed. Preferably, two lifting motors are utilized, one on the left side of the vehicle and one on the right, so that the height of the platen on the left and right sides can be adjusted independently of each other in order to provide for a camber adjustment.

Figure 17:
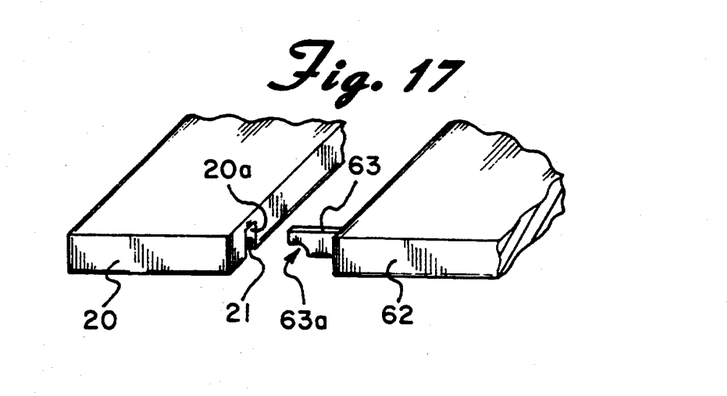
FIG. 17 is a schematic representation of a camber adjustment mechanism.

A camber adjustment would be needed to correct for an uneven or slanted floor to ensure that the platen properly aligns itself with a dryer shelf. This proper alignment is accomplished by the guide mechanism shown in FIG. 17. Extending outwardly from the front of each dryer shelf, such as shelf 62, are a pair of flat opaque tabs or flags located adjacent the sides of the shelf. Only one such flag 63 is shown in FIG. 17. It is understood, however, that an identical flag is arranged at the other side of the shelf. Flag 63 has a notch 63a formed therein at the forward lower end thereof.

The forward end of the platen 20 has a pair of slots formed therein which are directly opposed to the flags carried by the shelves. Slot 20a, for example, is directly opposite and in alignment with the flag 63. Located within the slot 20a is an electric eye 21 or similar detector which is capable of sensing the presence of the flag 63.

Alignment between the platen 20 and a shelf is achieved in the following manner. The apparatus is preprogrammed so that the platen is slightly higher than the shelf as the platen is moved toward the same. Forward movement of the platen is stopped when the flags are within the slots with the sensors either above the flag or intercepted by the portion of the flag above the notch 63a. The left and right lifting motors then move the platen downwardly until the sensor 21 senses the presence of the notch 63a. Since the left and right lifting motors are independently controlled by the left and right sensors, the height of the platen on the left and right sides can be independently controlled. Once a sensor recognizes its respective notch, its lifting motor stops and forward movement of the platen continues until it abuts the shelf.

As pointed out above, the rear ends of the side frame members 52 and 54 of the transfer cage 46 are pivoted at points 56 and 58 to a cage slide mechanism 60. There are, in fact, two such cage slide mechanisms, one on either side of the vehicle. For clarity, however, only one will be described, it being understood that this description applies equally to the other slide mechanism.

Figure 11:
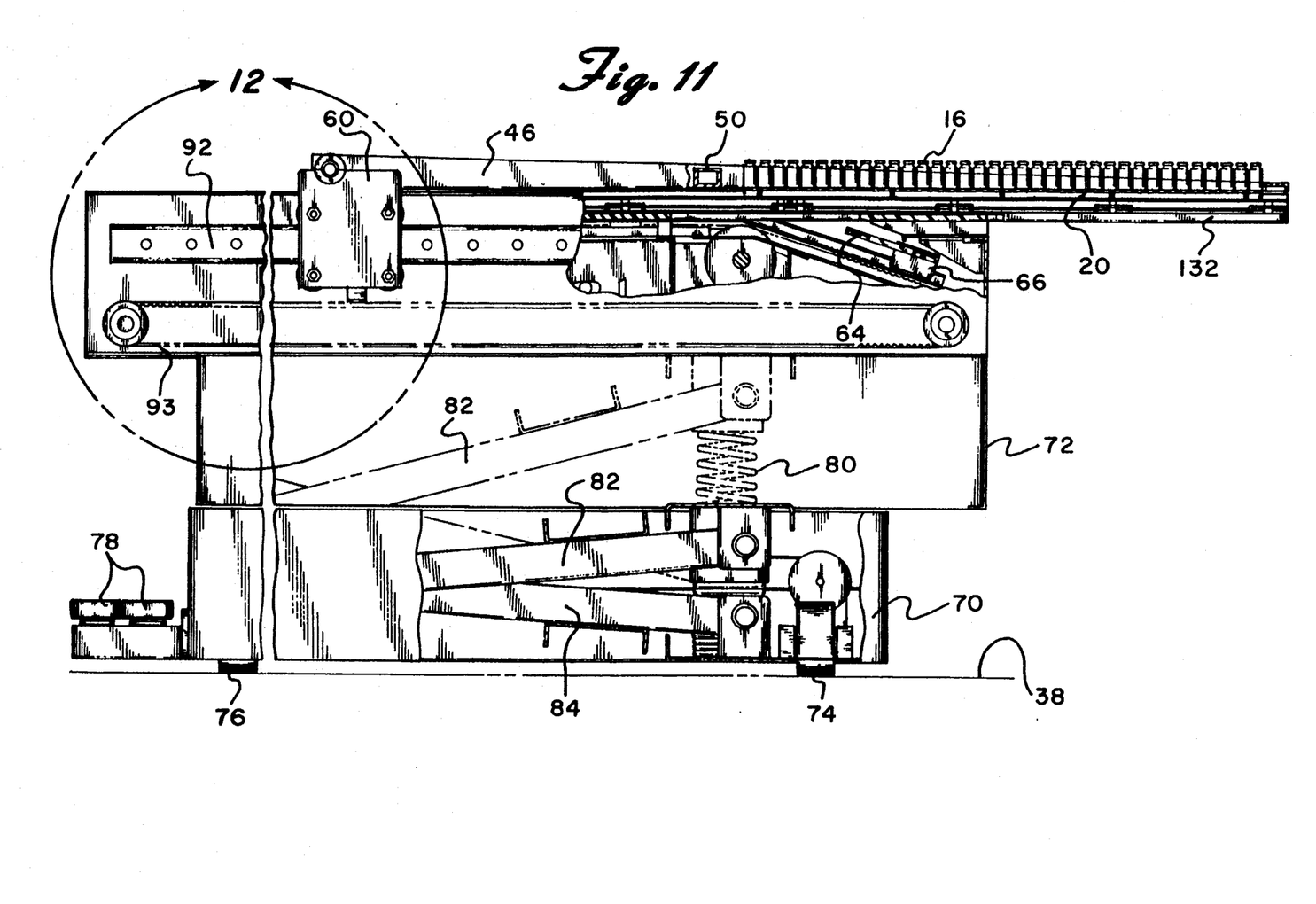
FIG. 11 is a side elevational view of the transfer vehicle with portions cut away to show the details of parts thereof.
Figure 12:
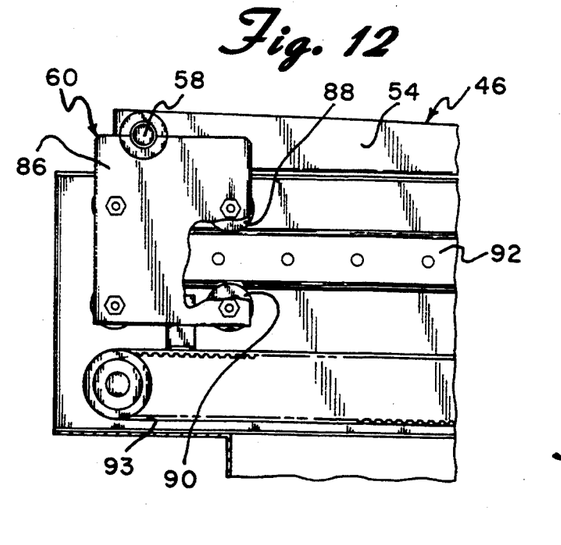
FIG. 12 is a detailed view of section 12—12 of FIG. 11.

As shown most clearly in FIGS. 11 and 12, the slide mechanism 60 is comprised, in part, of a rectangular plate 86. Mounted at the top of the plate 86 is a pivot pin 58 to which is pivoted the end of the side frame member 54 of the transfer cage 46. Four spaced apart wheels such as shown at 88 and 90 in FIG. 12 are rotatably supported on the inner surface of the plate 86. These spaced apart wheels ride on the upper and lower surfaces of an elongated cage slide 92 which is mounted on the upper portion of the frame assembly 72 and which runs substantially the entire length of the transfer vehicle. Moved by belt 93 (FIG. 11), the cage slide mechanism 60, therefore, functions essentially as a trolley which rides on the cage slide 92 and carries the transfer cage 46 forwardly and rearwardly therewith as the slide mechanism 60 moves.

Two different mechanisms are provided for pivoting the transfer cage upwardly. One is located at the forward end of the vehicle and is used to raise the crossbar 48 above the height of the bottles such as when the transfer cage is being moved into or out of the freeze dryer and must clear the tops of the bottles on a shelf. This mechanism is shown most clearly in FIG. 9.

Located on either side of the transfer vehicle is a vertically extending and vertically movable bar 94. FIG. 9 shows bar 94 on only one side of the transfer vehicle. It should be readily apparent that a similar arrangement currently being described is also located on the other side. Bar 94 carries a roller 96 at the top thereof which is adapted to engage the undersurface of one of the side frame members 52 or 54 of the cage 46 and not as a cam means. A spring, not shown, biases the bar 94 upwardly.

A pair of spaced apart upper and lower levers 98 and 100 are pivoted to the vehicle frame assembly 72 and to the bar 94 so as to guide the movement of the bar 94 in the vertical direction. A cam follower 102 mounted on the lower lever 100 engages cam 104 which is rotatable through the use of a drive belt 106 and pulley 108 connected to a motor, not shown. Obviously, other suitable moving means may be substituted for the drive belt, pulley and motor as desired. The cage lifting mechanisms on both sides of the vehicle, of course, operate in unison and when the cam 104 is rotated, the lifting bar 94 moves up or down, thereby also moving the transfer cage up or down, therewith.

Figure 13:
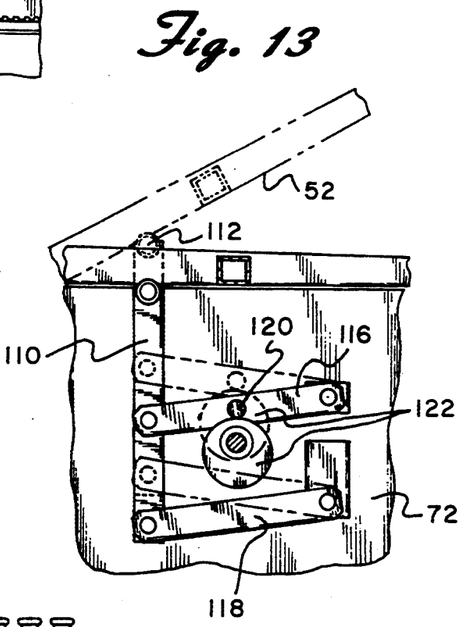
FIG. 13 is a detailed view of one of the mechanism for raising the vehicle cage used for removing bottles from the freeze dryer.
Figure 14:
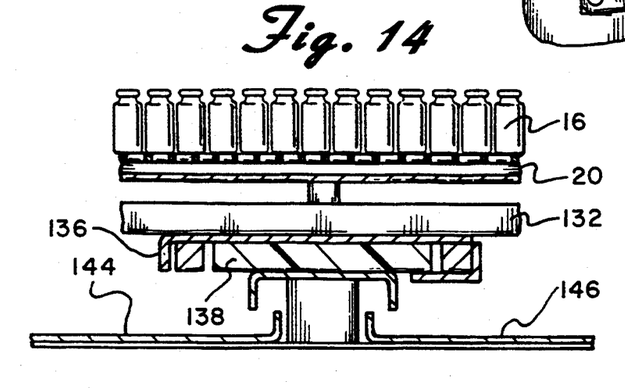
FIG. 14 is a detailed cross-sectional view of a portion of the vehicle platen assembly.

The second cage lifting mechanism is shown in FIG. 13 and is located closer to the rear end of the vehicle. This lifting mechanism is designed to lift the transfer cage somewhat higher so as to raise the bar 50 above the height of the bottles when it is desired to load bottles onto the platen from the loading station or to remove bottles therefrom onto the discharge station. The lifting mechanism shown in FIG. 13 is somewhat similar to that shown in FIG. 9. A vertically arranged and movable lifting bar 110 has a roller 112 mounted at the top thereof which engages the undersurface of the side frame member 52. A pair of levers 116 and 118 are pivoted to the bar 110 and to the vehicle frame 72 so as to guide the bar 110 in the vertical direction. A cam follower 120 carried by the lever 116 engages a cam 122 which, when properly rotated, is used to either raise the transfer cage or to allow the same to move downwardly through the use of a motor or under the force of gravity. Motor means (not shown) are provided for operating the cam 122.

The details of the operation of the discharge transfer guide 64 are shown most clearly in FIGS. 9 and 11. The discharge guide 64 which extends across the width of the platen 20 is supported at each of its ends by trolleys 66. These trolleys 66 are comprised essentially of flat plates which extend vertically and include a pair of rollers 124 and 126 projecting horizontally outwardly. Rollers 124 and 126 are contained within a track or channel 128 mounted on the vehicle frame assembly 72. There is, of course, a channel on either side of the frame assembly.

The channel 128 extends diagonally at the front end of the vehicle but horizontally for the remaining portion of the same. The discharge guide 64, therefore, can move from below the level of the platen 20 as shown in FIG. 9 upwardly to a level above the same as shown in FIG. 8 so that it can be used to push the bottles off of the platen in the manner described above. A belt 130 is secured to the trolleys 66 and, guided by the pulleys 132 and 134, moves the trolleys and, therefore, the discharge guide 64. Again, appropriate motor means or the like are provided for driving the belt 130.

As shown most clearly in FIG. 7, the platen 20 is comprised of a rigid metal plate having a plurality of holes or apertures therein. These apertures allow air to pass freely down from above, around any bottles on the platen and through the platen to the lower portion of the transfer vehicle.

The platen 20 is supported on a shuttle assembly comprised of a plurality of spaced apart transverse crossbars 132. A plurality of standoffs 134 secure the platen to the crossbars. Mounted below the crossbars are a plurality of elongated longitudinally extending plates such as shown at 136. These plates rest on a plurality of slide bars 138 secured to the upper surface of the transfer vehicle frame assembly 72. It can be seen, therefore, that the platen along with its shuttle assembly freely slides forwardly or rearwardly on the slide bars 138. A pair of belts 140 and 142 (FIG. 7) driven by appropriate motor means (not shown) are secured to the undersurface of the shuttle assembly and move the platen forwardly and rearwardly.

The upper surface of the vehicle frame assembly 72 below the platen is provided with a plurality of drip pans such as shown at 144 and 146. In the event that a bottle on the platen should tip and spill its contents, it may drip through the apertures in the platen 20 but will be caught by the drip pans 144 or 146 and will not fall into the operating mechanisms of the transfer vehicle.

Figure 15:
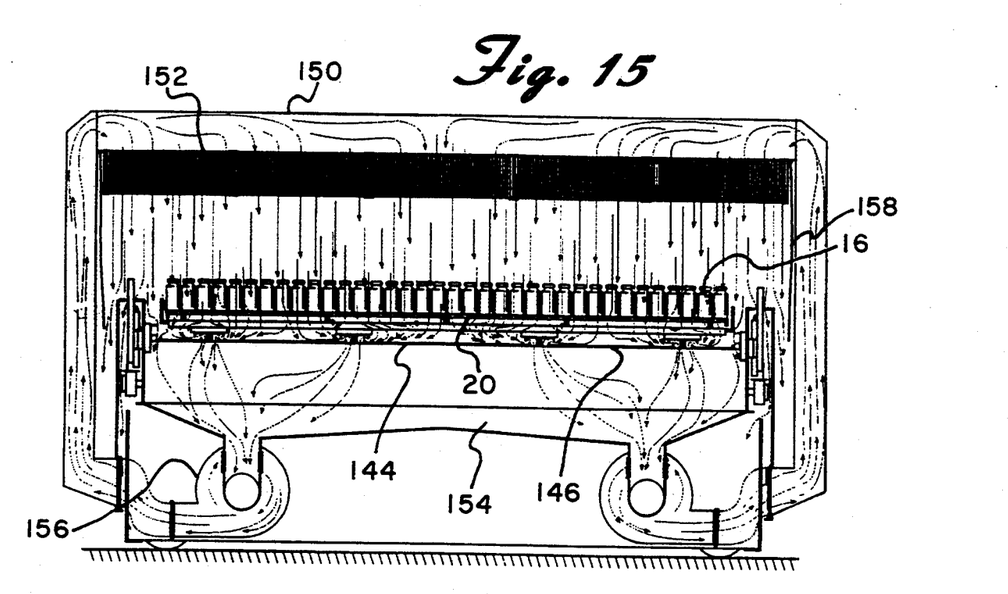
FIG. 15 is a schematic representation of the manner in which air travels through and around the transfer vehicle.
Figure 16:
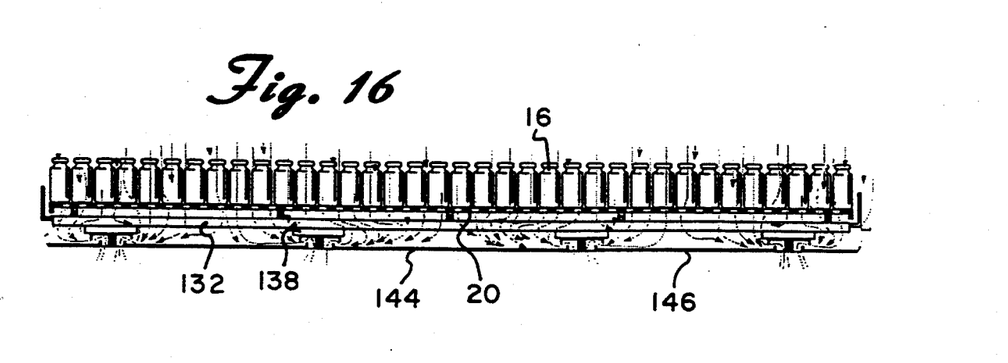
FIG. 16 is an enlarged view of the bottles and platen assembly shown in FIG. 15.

The drip pans are arranged, however, in such a way that air can freely flow downwardly through the apertures in the platen and around the edges of the drip pans as shown in FIG. 16. As a result, the transfer vehicle 18 can be provided with a filtered air supply as shown in FIG. 15. As illustrated, a laminar flow hood 150 is mounted above the vehicle. Air from the hood 150 passes downwardly through filters 152 and continues downwardly around the bottles 116 and through the holes in the platen 20. The air then passes around the drip pans 144 and 146 and downwardly through duct work 154 located beneath the platen and with the use of blowers 156, back up to the laminar flow hood 150. The entire vehicle can, of course, be surrounded by plastic curtains such as shown at 158.

The present invention may be embodied in other specific forms without departing from the spirit or essential attributes thereof. By way of example, while the invention has been described with particular reference to a freeze dryer, this is merely the presently preferred use thereof. The invention is similarly applicable to other types of material treating apparatuses such as ovens, autoclaves and the like. Accordingly reference should be made to the appended claims rather than to the foregoing specification as indicating the scope of the invention.

We claim:

1. An automatic loading and unloading system comprising:
   a loading station and means at said loading station for accumulating a quantity of containers upright on a horizontal loading surface;
   a transfer vehicle having a horizontally arranged platen;
   means for moving said platen into alignment with said horizontal loading surface;
   first transfer means for transferring containers from said loading surface onto said platen;
   a material treating apparatus including at least one horizontal shelf therein which is accessible from outside of said apparatus;
   means for moving said platen into alignment with said shelf;
   second transfer means for transferring containers from said platen onto said shelf;
   third transfer means for transferring containers from said shelf onto said platen, said third transfer means being comprised of a frame having elongated left and right side frame members each of which has a first end and a second end, the first ends of said side frame members being pivotally mounted on and carried by said vehicle, the second ends of said side frame members having a transfer bar horizontally extending therebetween, and
   frame lifting means mounted on said vehicle and located between said first and second ends of said side frame members, said frame lifting means comprising at least one cam means adapted to engage the underside of at least one of said side frame members and means for moving said cam means vertically to selectively raise or lower said frame.

2. The invention as claimed in claim 1 further including a discharge station having an unloading surface and fourth transfer means for transferring containers from said platen onto said unloading surface.

3. The invention as claimed in claim 2 wherein said fourth transfer means is mounted on and carried by said vehicle.

4. The invention as claimed in claim 1 wherein said means for moving said platen moves the same horizontally.

5. The invention as claimed in claim 1 wherein said means for moving said platen moves the same vertically.

6. The invention as claimed in claim 1 further including a plurality of separate and distinct material treating apparatuses and means for moving said vehicle into alignment with any one of said apparatuses.

7. The invention as claimed in claim 1 wherein said first transfer means is located at said loading station and includes means for pushing containers onto said platen.

8. The invention as claimed in claim 1 wherein said second transfer means is mounted on and carried by said vehicle.

9. The invention as claimed in claim wherein said third transfer means includes means for moving said transfer bar into and out of said apparatus.

10. The invention as claimed in claim 9 wherein said frame lifting means is adapted to elevate said transfer bar over the height of said containers.

11. The invention as claimed in claim 10 wherein said frame lifting means is adapted to lower said transfer bar after it has fully entered said apparatus.

12. The invention as claimed in claim 1 wherein said platen has a plurality of openings in the surface thereof.

13. The invention as claimed in claim 12 further including means for drawing air from above said platen downwardly through said openings.

14. The invention as claimed in claim 1 wherein said vehicle has a front end and a rear end, said loading station being adjacent said rear end and said apparatus being adjacent said front end.

15. The invention as claimed in claim 14 wherein said platen is selectively movable forwardly and rearwardly so as to selectively be in alignment with said loading surface or said shelf.

16. The invention as claimed in claim 14 including means for moving said vehicle sideways, perpendicular to said front and rear ends.

17. The invention as claimed in claim 1 wherein said apparatus is a freeze dryer.

* * * * *